Feb. 11, 1969  SHOZABURO MORIYA  3,427,176

THREE-DIMENSIONAL COLORING COMPOSITION

Filed Nov. 15, 1963

United States Patent Office 3,427,176
Patented Feb. 11, 1969

3,427,176
THREE-DIMENSIONAL COLORING COMPOSITION
Shozaburo Moriya, Marugame-shi, Japan, assignor to Shikoku Kasei Kogyo Company Ltd., Marugame-shi, Japan
Filed Nov. 15, 1963, Ser. No. 324,103
Claims priority, application Japan, Nov. 28, 1962, 37/52,170
U.S. Cl. 106—157       4 Claims
Int. Cl. B29j 5/02; B44f 7/00; B44c 3/00

ABSTRACT OF THE DISCLOSURE

A three-dimensional coloring material consisting essentially of a plastic hydrous paste which is adapted for being stored and squeezed from a tube. The paste comprises a carrier of crushed pulp, wood flour or ground fibrous material of less than 300 microns in size, a coloring agent operatively combined with the carrier to impart color thereto and constituted either as a pigment or dyestuff, a powdery water-soluble adhesive of less than about 500 microns size mixed with the carrier, and a fluid embodying the carrier and adhesive.

---

Figure 1:
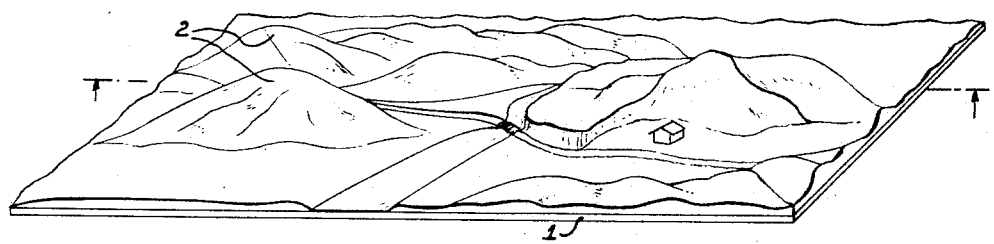

This invention relates to methods of producing three-dimensional coloring material, to the coloring material itself, and to products made with said coloring material.

A basic object of this invention is to provide a three-dimensional coloring material which can be used to paint letters, pictures, patterns, and various types of intelligence in three-dimensional form on a paper, cloth, board, and any such surface in a manner whereby the coloring material is piled up to a substantial height.

Another object of this invention is to provide a three-dimensional coloring material which is sufficiently plastic and whose volume is substantially invariable during drying.

A further object is to provide a coloring material superior to those comprising carriers of powdery mineral origin.

Still another object of this invention is to provide a three-dimensional coloring material which will not crack or peel even though piled up to a substantial height.

Yet another object of this invention is to provide a three-dimensional coloring material which is substantially hydrophilic but which is not too sticky even in rainy or damp weather.

A further object of this invention is to provide a three-dimensional coloring material having a fine texture and adapted for finger painting and giving a soft and smooth touch.

A still further object of this invention is to provide a three-dimensional coloring material which is useful without the need for a brush, and which can be squeezed from a tube directly onto a canvas or the like and used in painting by the use of finger painting techniques.

In accordance with one aspect of this invention as noted above, there is provided a method of producing a three-dimensional coloring material, which method comprises coloring a carrier with one or more coloring agents. The carrier used in the invention is preferably of a particle size of 300 microns and less and may be crushed wood pulp, wood flour, ground fibrous material such as wool and synthetic fiber, or the like. The coloring agent is a pigment or dyestuff and may be, for example, benzidine yellow (yellow), pyrazolon orange (orange), phthalocyanin blue (blue), phthalocyanin green + hanza yellow (green), phthalocyanin blue + naphthol red + benzidine yellow (brown), carbon black (black), naphthol red (red), etc. The colored carrier is mixed with a powdery adhesive so as to obtain a powdery three-dimensional coloring material. The mixture is kneaded with an appropriate quantity of water (200–600 parts water to 100 parts dry material) to obtain a pasty coloring material.

The powdery adhesive is preferably of a particle size of 500 microns and less and may, for example, be polyvinyl alcohol, sodium carboxymethyl cellulose, starch, dextrine, or the like, which are water-soluble powders.

The surfaces on which the three-dimensional coloring material may be painted include the surfaces of paper, cloth, or board, or the like, and objects such as relief maps and the like are readily made with materials of the invention.

Figure 2:
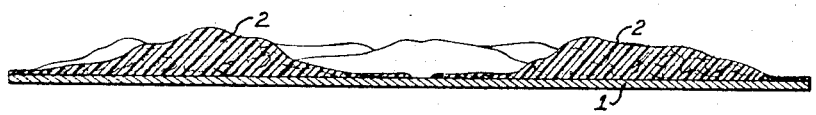

The invention will be better understood, and other objects and advantages of the invention will become apparent, from the following description taken in connection with the accompanying drawing in which:

FIGURE 1 is a perspective view of a three-dimensional picture painted with the three-dimensional coloring material produced in accordance with a method embodying this invention; and FIGURE 2 is a cross-sectional view taken along line II—II in the article of FIGURE 1.

Preferred embodiments of this invention will next be described, it being noted, however, that this description is illustrative of the invention and does not limit it to the particular method described.

EXAMPLE 1

100 parts by weight of crushed pulp were mixed with 10 parts of a pigment and 100 parts of a 10% aqueous emulsion of acrylic resin and kneaded to obtain a homogeneously colored mixture. After the mixture is dried, it is further mixed with 15 parts of sodium carboxymethyl cellulose, yielding a powdery three-dimensional coloring material.

This product was kneaded with a quantity of water adapted to provide a paint having an appropriate hardness. It is readily possible to paint a three-dimensional picture with this paint.

EXAMPLE 2

100 parts of the powdery colored crushed pulp mixture obtained in the preceding example were mixed with 500 parts of 3% aqueous solution of sodium carboxymethyl cellulose and kneaded to yield a hydrous paste of three-dimensional coloring material.

EXAMPLE 3

500 parts of a 10% aqueous emulsion of vinyl acetate resin were added to 100 parts of the powdery colored crushed pulp mixture obtained in Example 1 and kneaded thoroughly to yield a hydrous paste of the three-dimensional coloring material.

The powdery three-dimensional coloring material produced in accordance with this invention, when kneaded with water, and the pasty three-dimensional coloring material produced in accordance with this invention, was used as the paint by which three-dimensional pictures were painted. It was found that the paint was sufficiently plastic due to the fibrous nature of the carrier. The variation in volume of the paint during drying was found to be extremely small and less than that of other paints having a powdery mineral carrier. Therefore, it is readily possible to keep a three-dimensional picture 2 on a board 1 as illustrated in FIGS. 1 and 2 in the originally deposited state without any deformation upon drying.

By virtue of the fact that the carrier is a fibrous material, wherein the fibrous particles may tangle with each other, it is possible to pile up the paint to a substantial height without cracking and peeling.

By virtue of the same fact, the paint is hydrophilic without the drawback of becoming too sticky. Further, it has a soft and smooth feeling when used for finger painting.

It is also advantageously possible to store the hydrous paste of three-dimensional coloring material within a plastic tube, which may be used to paint a picture with the three-dimensional material being squeezed out of the tube directly onto the receiving surface. It is also well adapted for use in finger painting without the need for a brush.

It will be realized that it is possible to use materials of the invention to paint relief maps, frescos, three-dimensional models, and three-dimensional decorations. Thus, various arts and techniques will be facilitated by the three-dimensional coloring material of the invention.

What is claimed is:

1. A three-dimensional coloring material consisting essentially of a hydrous paste comprising a fibrous carrier selected from the group consisting of crushed pulp and ground fibrous material of less than about 300 microns in size, a coloring agent operatively associated with said carrier to impart color thereto and selected from the group consisting of pigments and dyestuffs, a powdery water-soluble adhesive of less than about 500 microns size mixed with said carrier and selected from the group consisting of polyvinyl alcohol, sodium carboxymethyl cellulose, starch and detrine, and a fluid embodying the carrier and adhesive.

2. A three-dimensional coloring material consisting essentially of a plastic hydrous paste which is adapted for being stored and squeezed from a tube, said paste comprising a carrier selected from the group consisting of crushed pulp, wood flour and ground fibrous material of less than about 300 microns in size, a coloring agent operatively combined with said carrier to impart color thereto and selected from the group consisting of pigments and dyestuffs, a powdery water-soluble adhesive of less than about 500 microns size mixed with said carrier and a fluid embodying the carrier and adhesive.

3. A material as claimed in claim 2 wherein said fibrous material is wool.

4. A material as claimed in claim 2 wherein said fibrous material is a synthetic fiber.

References Cited

UNITED STATES PATENTS

| | | | |
|---|---|---|---|
| 718,890 | 1/1903 | Walter | 264—257 |
| 1,885,475 | 11/1932 | Persiel et al. | |
| 2,127,298 | 8/1938 | Isaacs | 106—193 XR |
| 2,461,900 | 2/1949 | Johnson | 106—193 |
| 2,764,496 | 9/1956 | Vogel et al. | 106—208 XR |
| 3,100,063 | 8/1963 | Henriksen. | |
| 1,857,690 | 5/1932 | Mellanoff | 117—152 X |
| 2,787,555 | 4/1957 | Drummond | 270—17 X |
| 2,131,371 | 9/1938 | Esselen | 260—9 |
| 2,292,542 | 8/1942 | Patterson | 260—9 X |
| 2,340,866 | 2/1944 | Dangelmajer | 260—17.4 X |
| 2,406,705 | 8/1964 | Mrajek. | |

FOREIGN PATENTS

| | | |
|---|---|---|
| 914,683 | 7/1949 | Germany. |
| 494,929 | 11/1938 | Great Britain. |

ROBERT F. BURNETT, *Primary Examiner.*

WILLIAM A. POWELL, *Assistant Examiner.*

U.S. Cl. X.R.

106—193, 204, 214; 161—19, 116; 156—59; 117—37, 157